US009776514B2

(12) United States Patent
Sobu et al.

(10) Patent No.: US 9,776,514 B2
(45) Date of Patent: Oct. 3, 2017

(54) DC-DC CONVERTER

(71) Applicant: Hitachi Automotive Systems, Ltd., Hitachinaka-shi, Ibaraki (JP)

(72) Inventors: Yuuji Sobu, Hitachinaka (JP); Mikito Komatsu, Hitachinaka (JP); Keisuke Fukumasu, Tokyo (JP); Tatsuya Nakazawa, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 287 days.

(21) Appl. No.: 14/653,420

(22) PCT Filed: Nov. 6, 2013

(86) PCT No.: PCT/JP2013/079952
§ 371 (c)(1),
(2) Date: Jun. 18, 2015

(87) PCT Pub. No.: WO2014/103518
PCT Pub. Date: Jul. 3, 2014

(65) Prior Publication Data
US 2015/0306960 A1  Oct. 29, 2015

(30) Foreign Application Priority Data
Dec. 28, 2012 (JP) ................................. 2012-286604

(51) Int. Cl.
*B60L 1/00* (2006.01)
*H02M 1/44* (2007.01)
(Continued)

(52) U.S. Cl.
CPC ................ *B60L 1/00* (2013.01); *H02M 1/44* (2013.01); *H02M 3/04* (2013.01); *H02M 3/3376* (2013.01);
(Continued)

(58) Field of Classification Search
CPC .... H05K 7/1432; H05K 9/0037; H02M 7/003
See application file for complete search history.

(56) References Cited

U.S. PATENT DOCUMENTS

2009/0243764 A1* 10/2009 Hauenstein ............. H01L 25/16
333/24 C
2013/0100634 A1   4/2013 Okubo et al.
(Continued)

FOREIGN PATENT DOCUMENTS

JP    11-299260 A   10/1999
JP   2002-214729 A   7/2002
(Continued)

OTHER PUBLICATIONS

International Search Report (PCT/ISA/210) dated Feb. 18, 2014 with English-language translation (five (5) pages).

*Primary Examiner* — Jeffrey Shin
(74) *Attorney, Agent, or Firm* — Crowell & Moring LLP

(57) ABSTRACT

As an object of reducing a noise resulted from the mutual influences between circuit-configuring components, a DC-DC converter includes a high voltage circuit section that is electrically connected to a transformer, a low voltage circuit section that is electrically connected to the transformer, a housing in which the high voltage circuit section and the low voltage circuit section are accommodated, a control circuit board that controls the driving of the low voltage circuit section, and a frame that supports the control circuit board. The frame is arranged on a position facing a bottom surface of the housing while crossing the low voltage circuit section. The housing includes a first wall that separates a first space in which the high voltage circuit section is accommodated and a second space in which circuit components configuring the low voltage circuit section are accommodated. The
(Continued)

frame forms a second wall that protrudes toward a direction approaching a leading end of the first wall.

8 Claims, 14 Drawing Sheets

(51) Int. Cl.
  *H02M 3/335*  (2006.01)
  *H02M 3/337*  (2006.01)
  *H02M 7/00*  (2006.01)
  *H02M 3/04*  (2006.01)

(52) U.S. Cl.
  CPC ....... *H02M 3/33576* (2013.01); *H02M 7/003* (2013.01)

(56) References Cited

U.S. PATENT DOCUMENTS

| | | | | |
|---|---|---|---|---|
| 2014/0321065 | A1* | 10/2014 | Nishimura | H05K 1/0203 361/722 |
| 2015/0048675 | A1* | 2/2015 | Fujii | H05K 9/0037 307/10.1 |

FOREIGN PATENT DOCUMENTS

| | | |
|---|---|---|
| JP | 2007-180683 A | 7/2007 |
| JP | 2010-245232 A | 10/2010 |
| JP | 2012-178937 A | 9/2012 |
| JP | 2013-90533 A | 5/2013 |

\* cited by examiner

[Fig. 1]
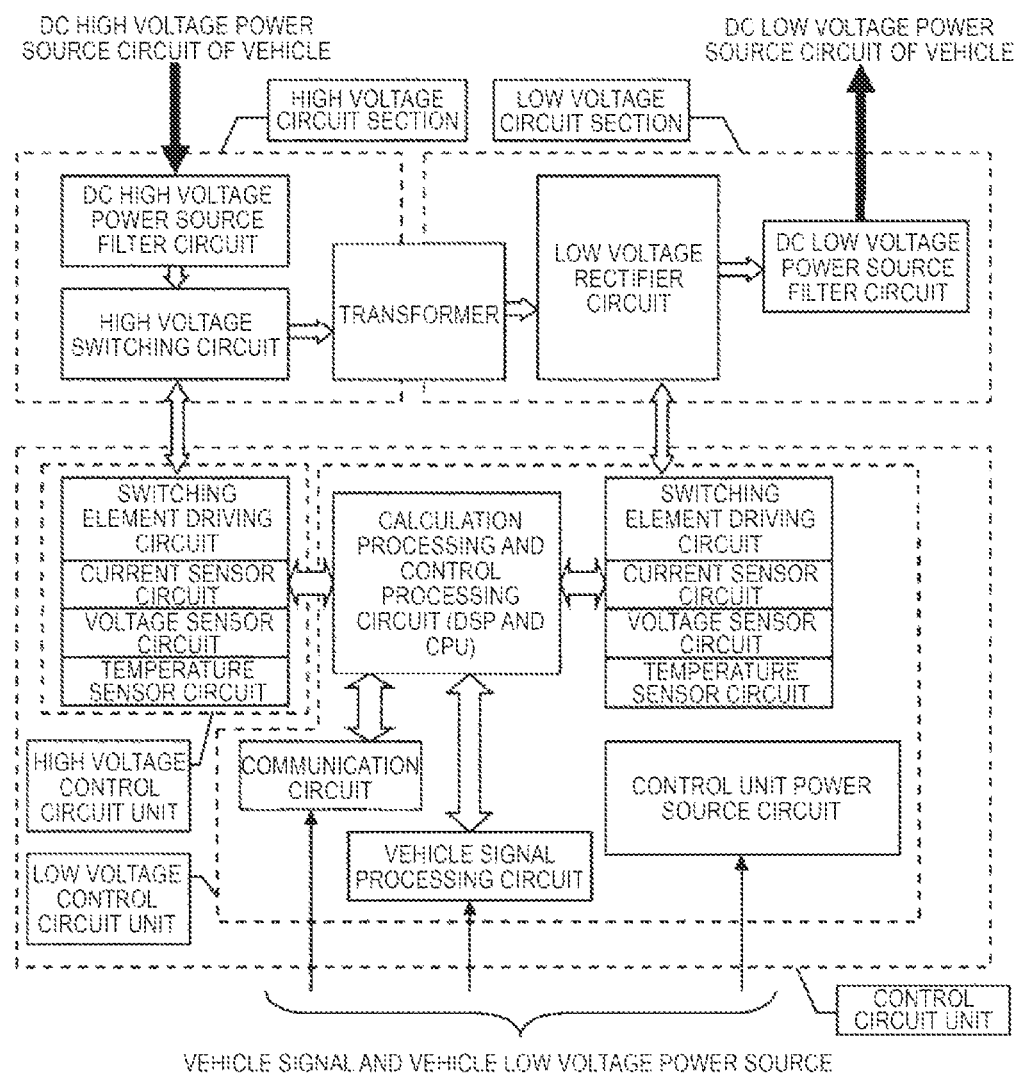

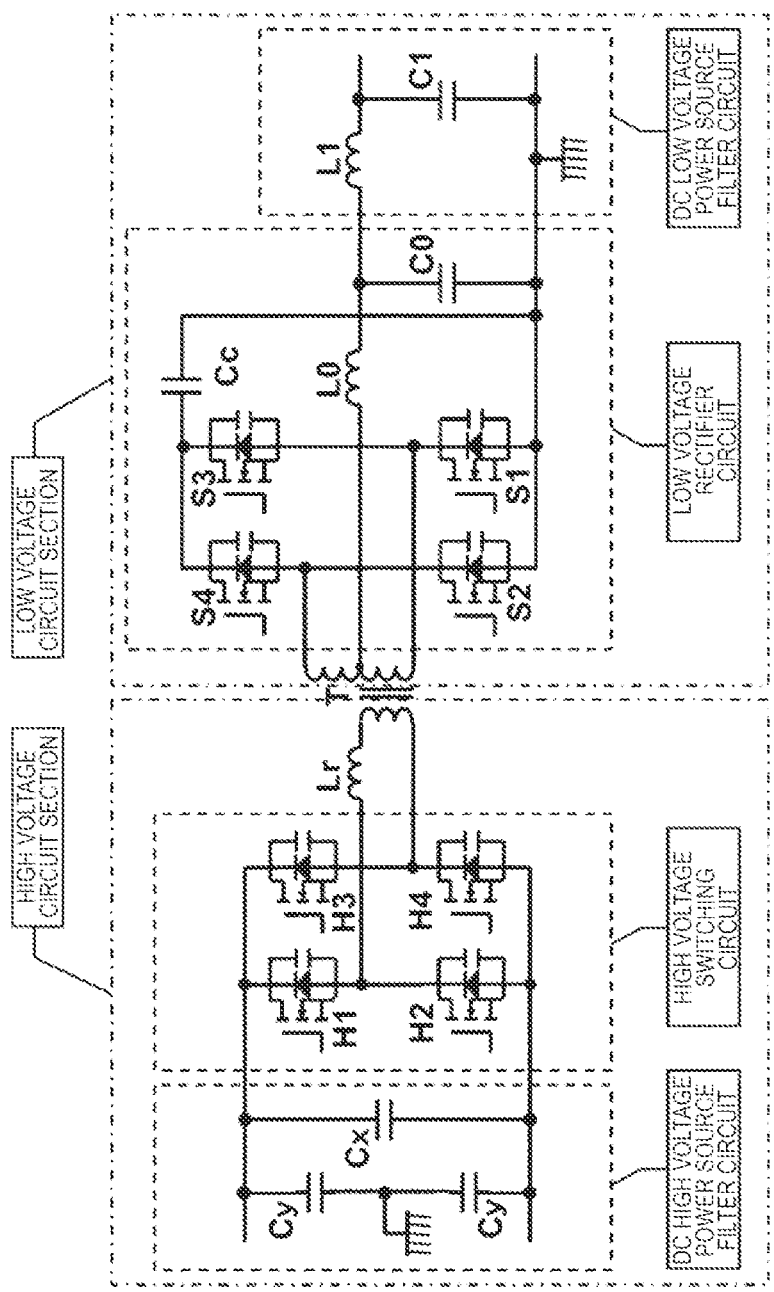
[Fig. 2]

[Fig. 3]
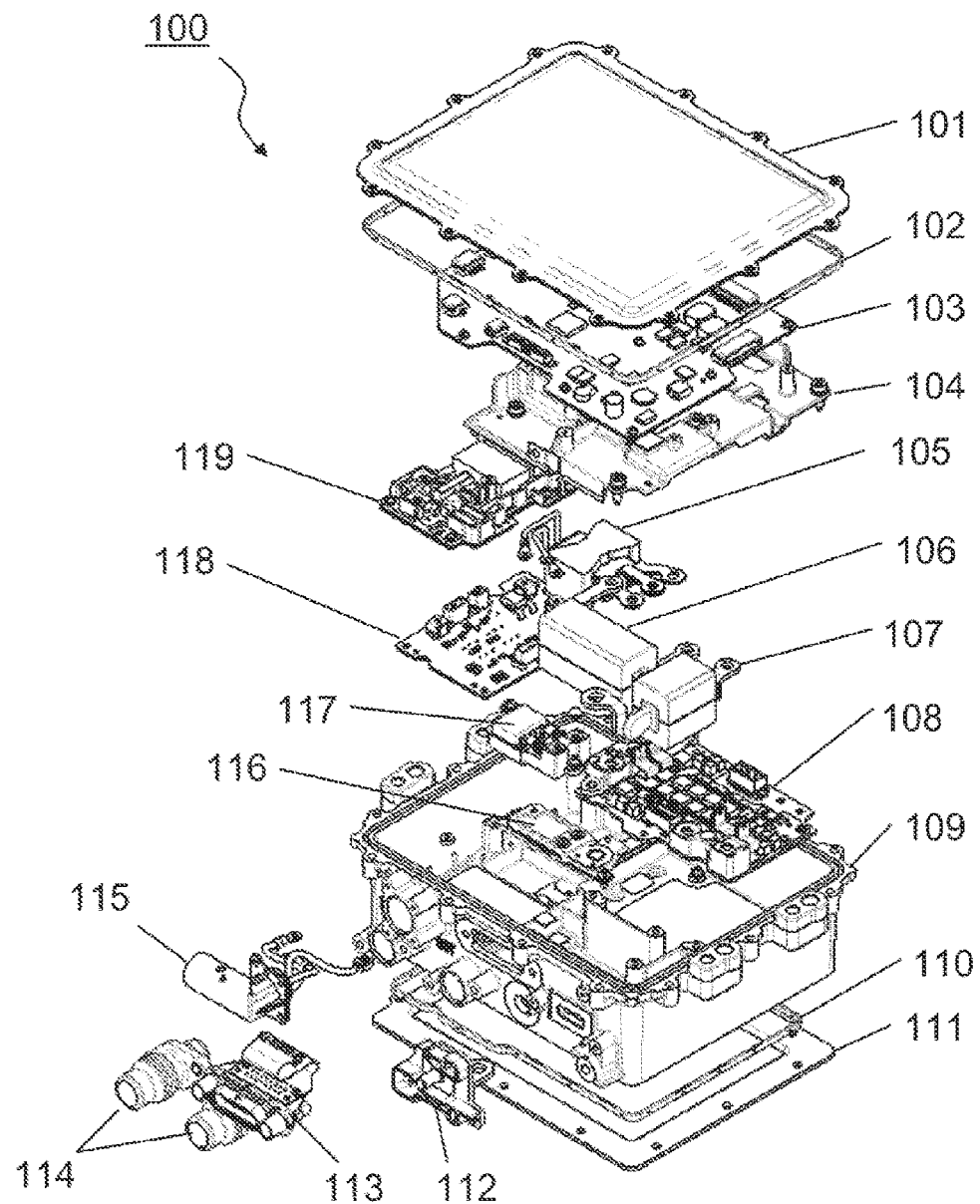

[Fig. 4A]
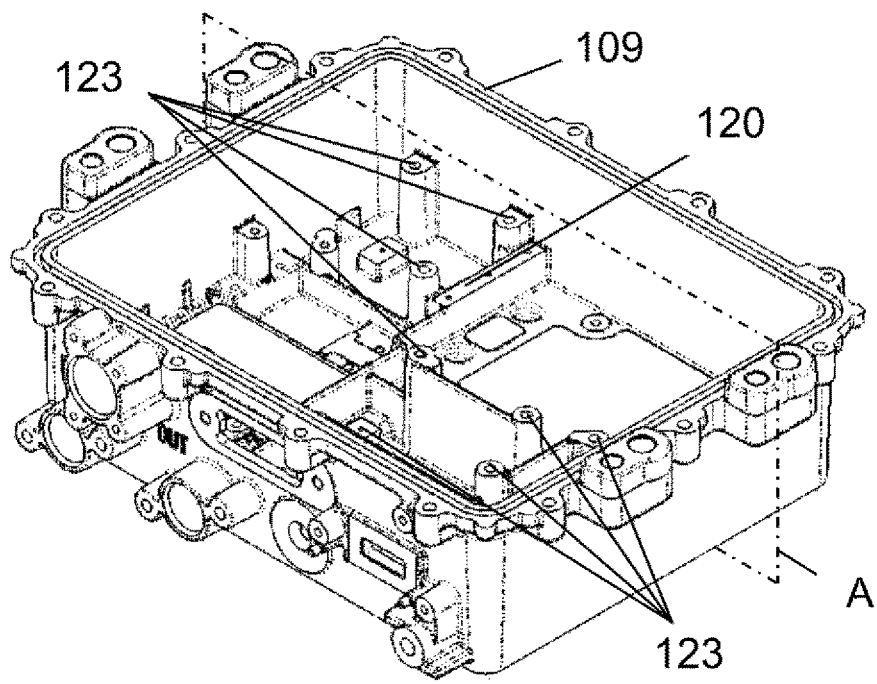
[Fig. 4B]
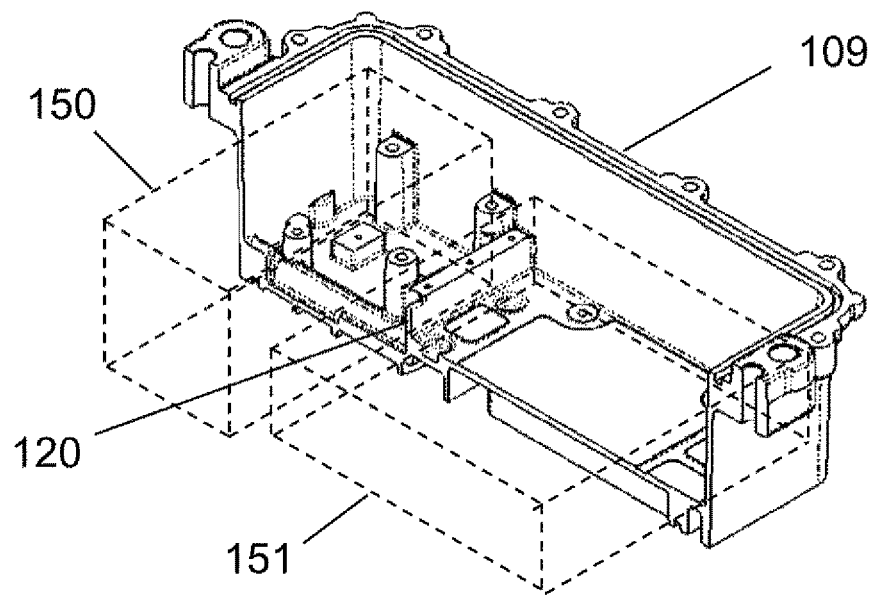

[Fig. 5]
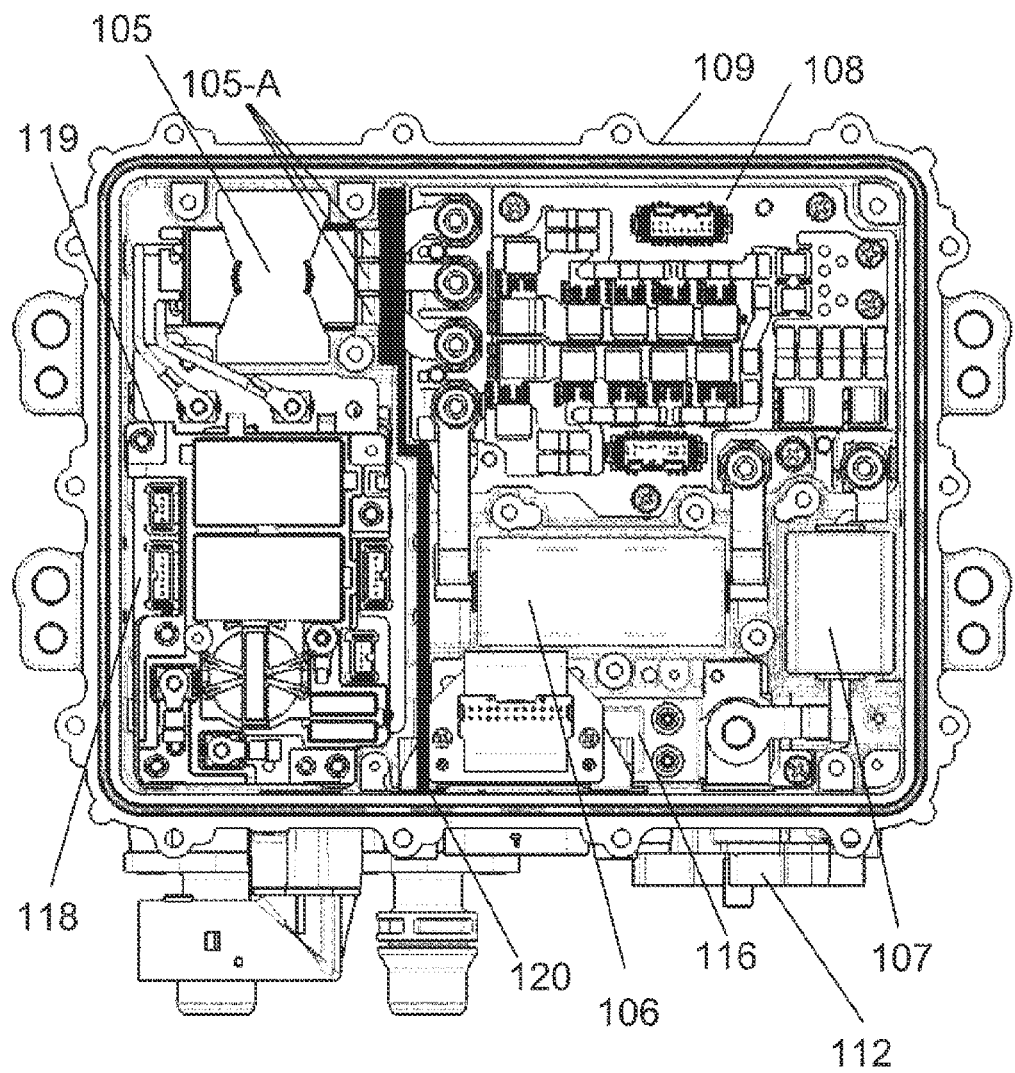

[Fig. 6A]
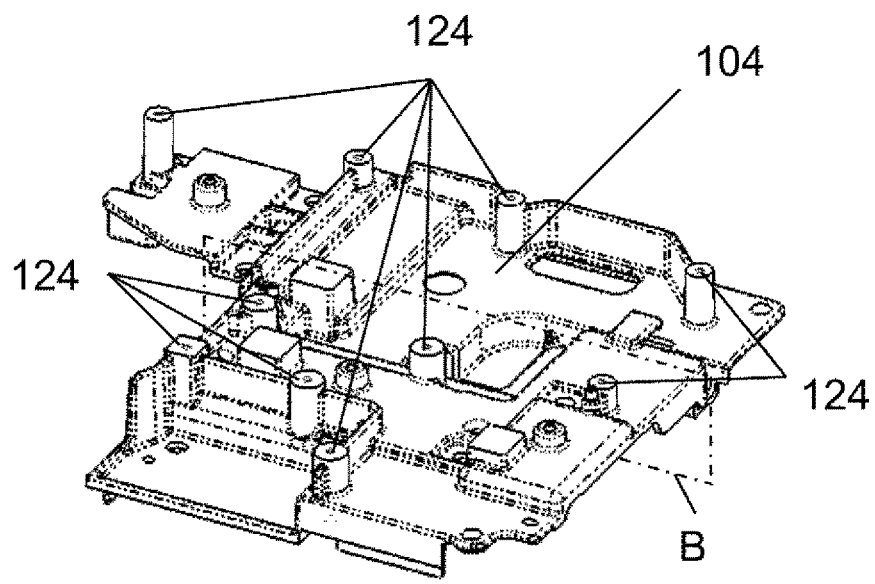
[Fig. 6B]
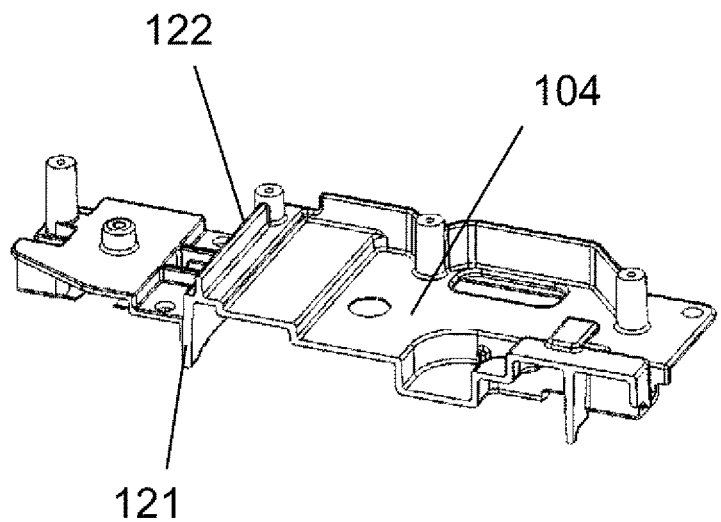

[Fig. 7]
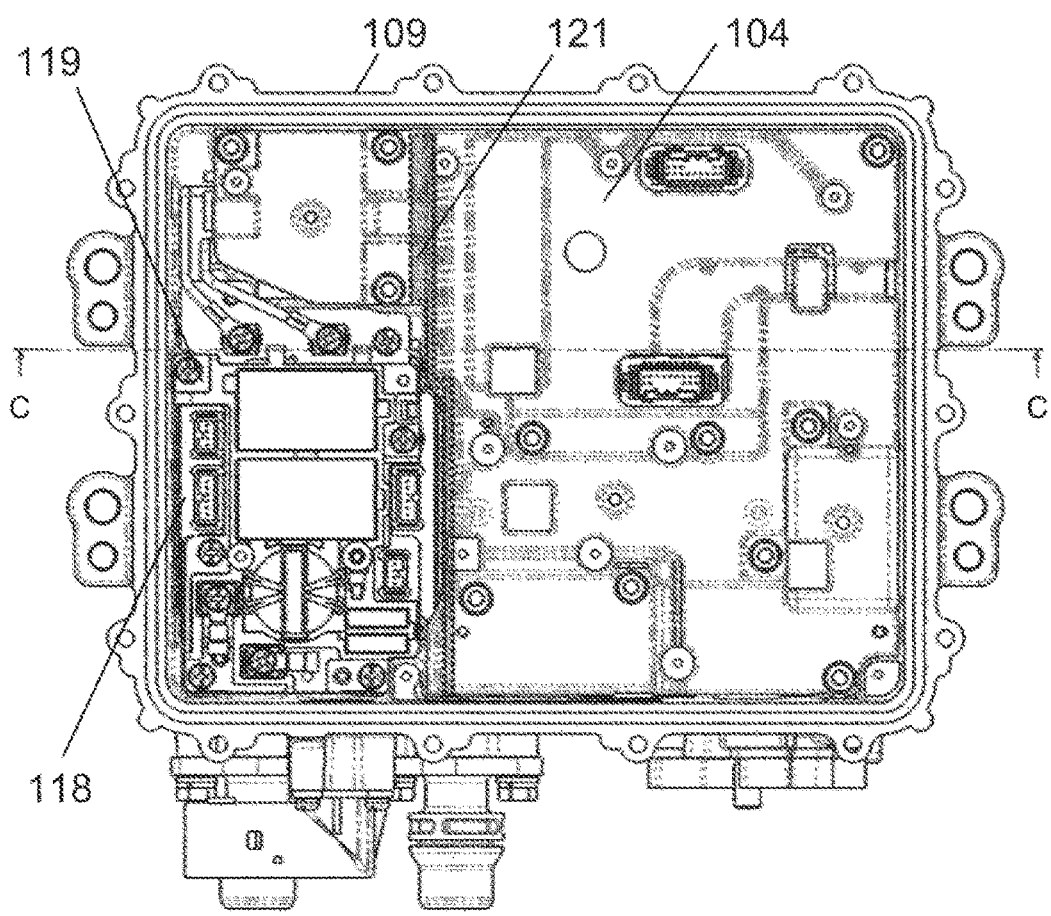

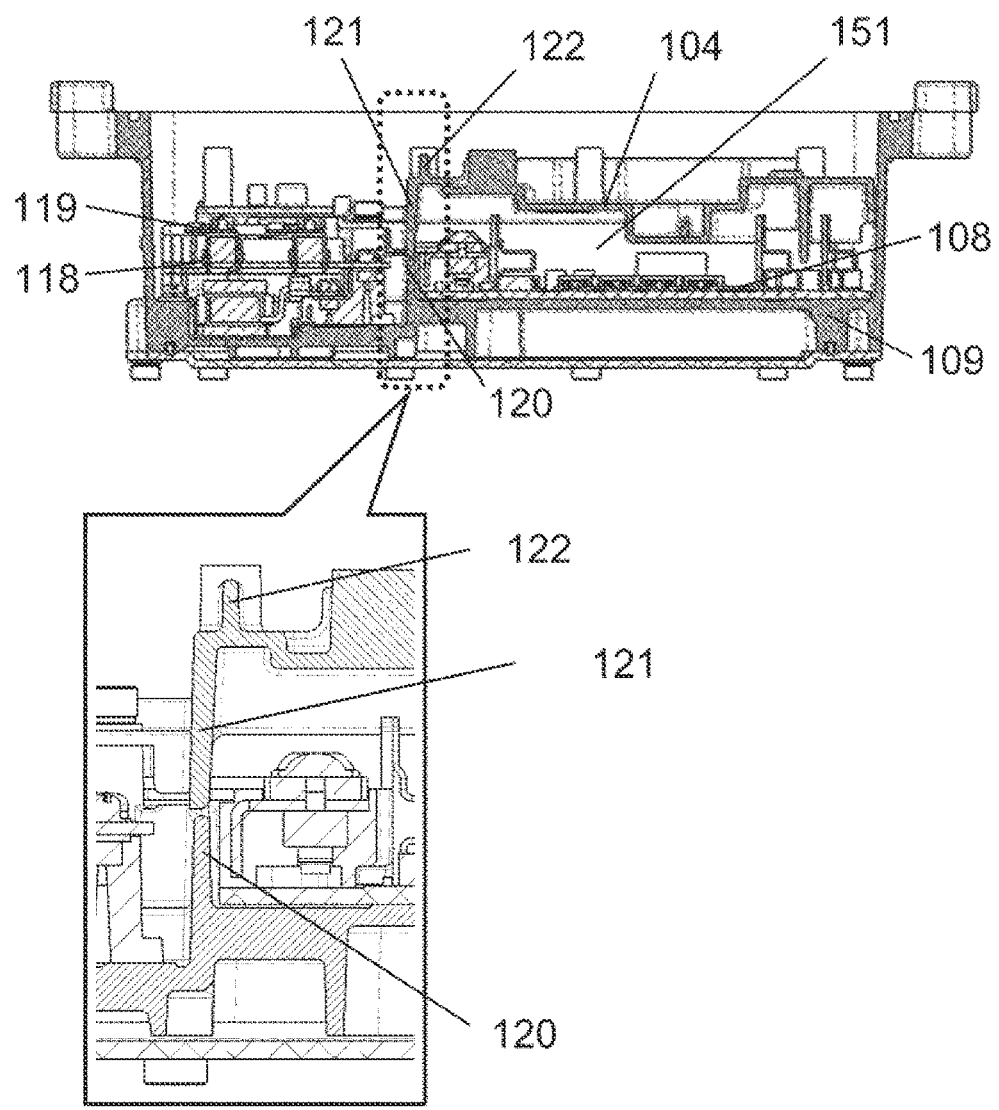
[Fig. 8]

[Fig. 9]
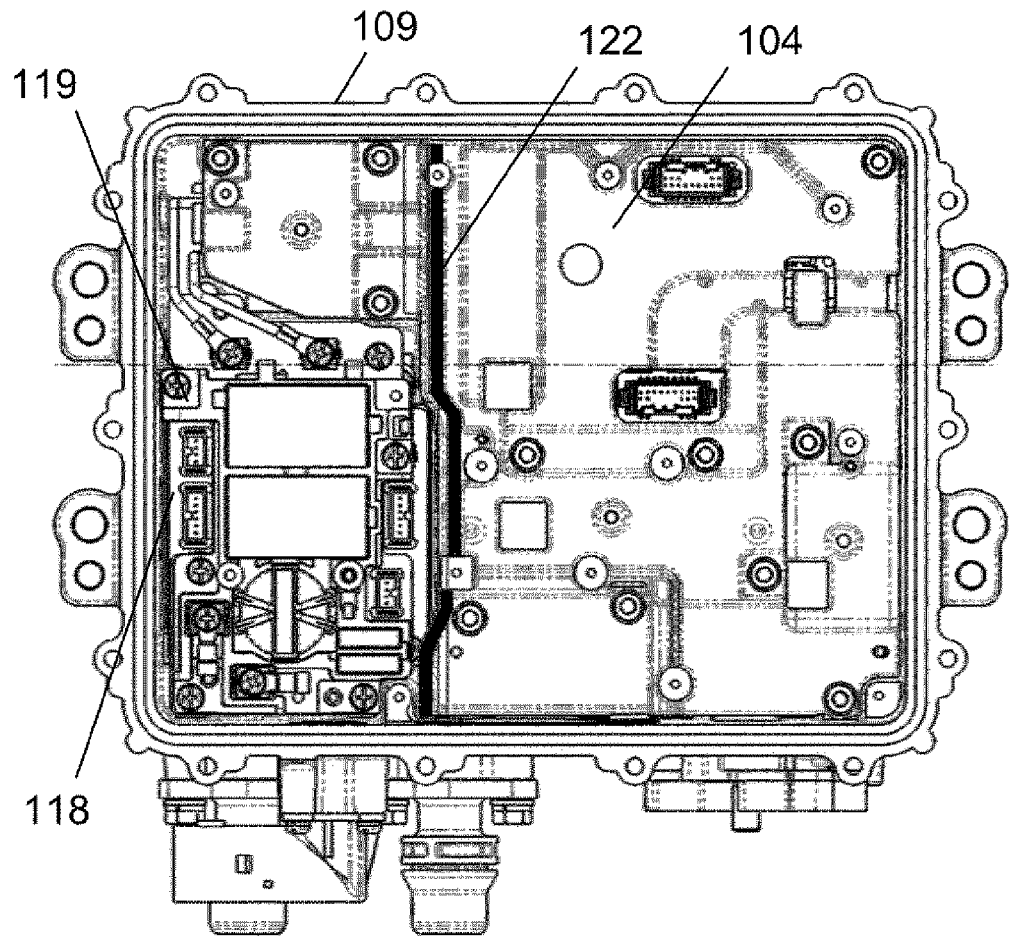
[Fig. 10A]
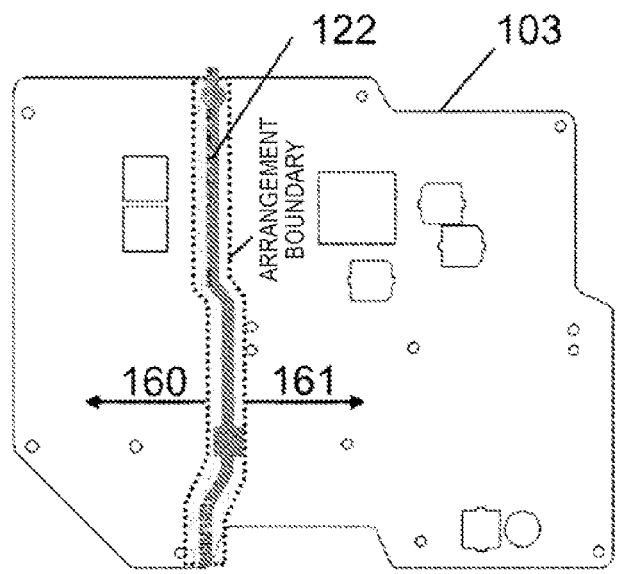

[Fig. 10B]
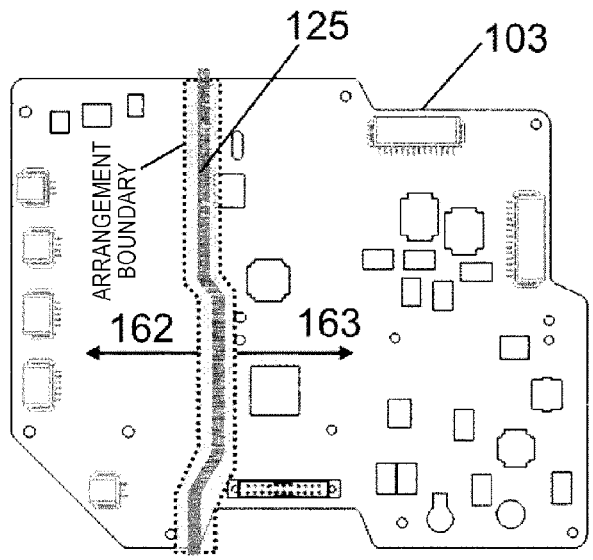
[Fig. 11]
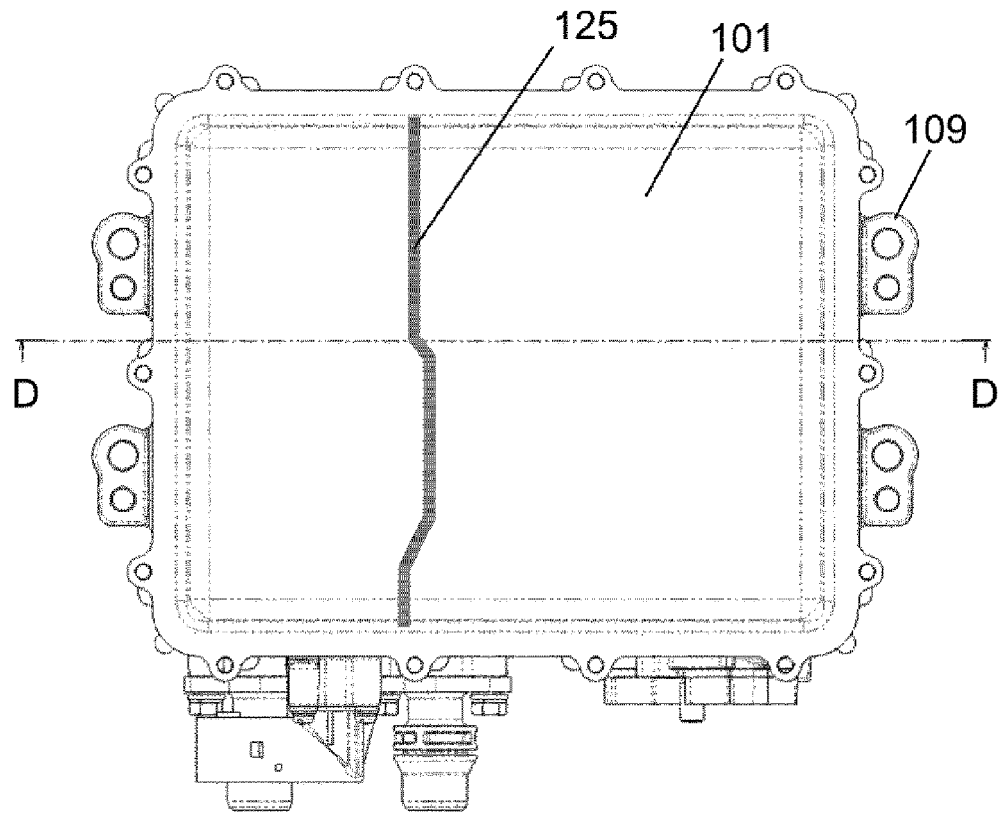

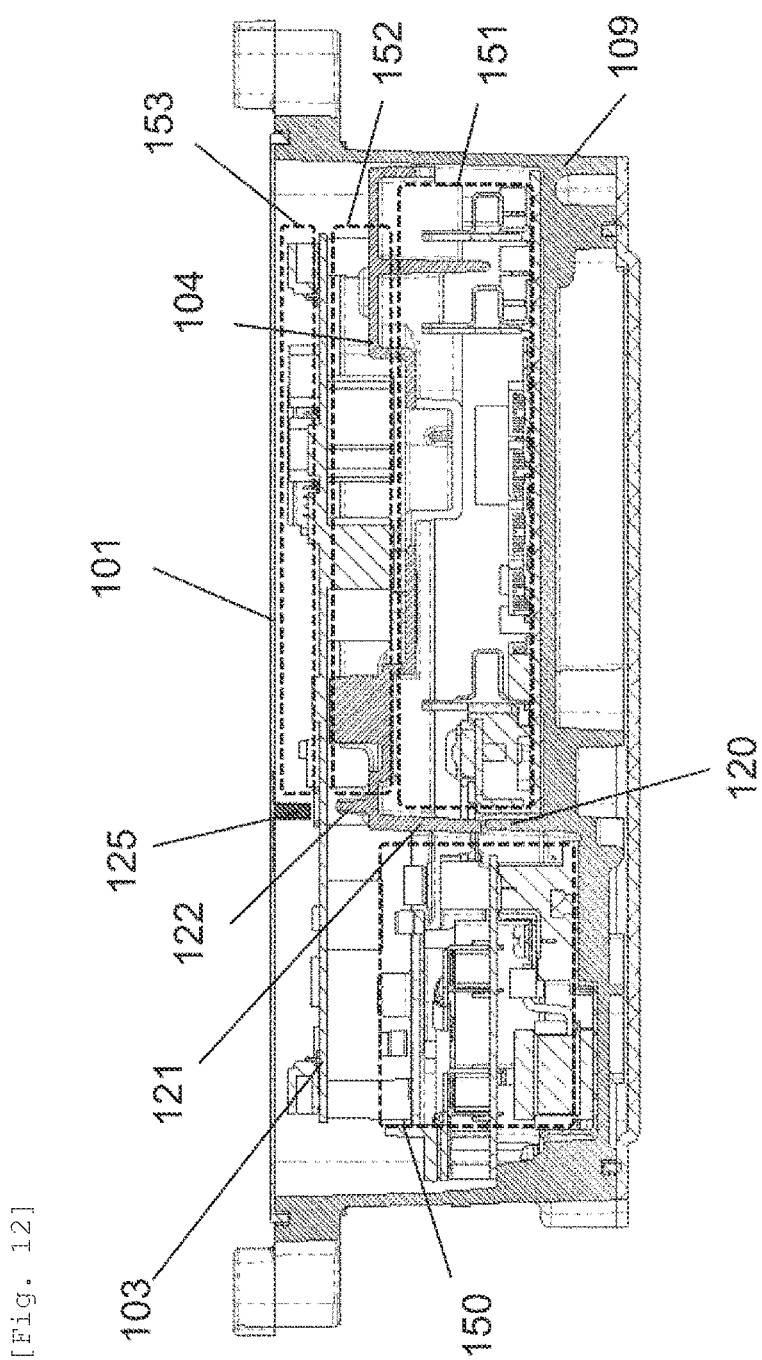
[Fig. 12]

[Fig. 13]
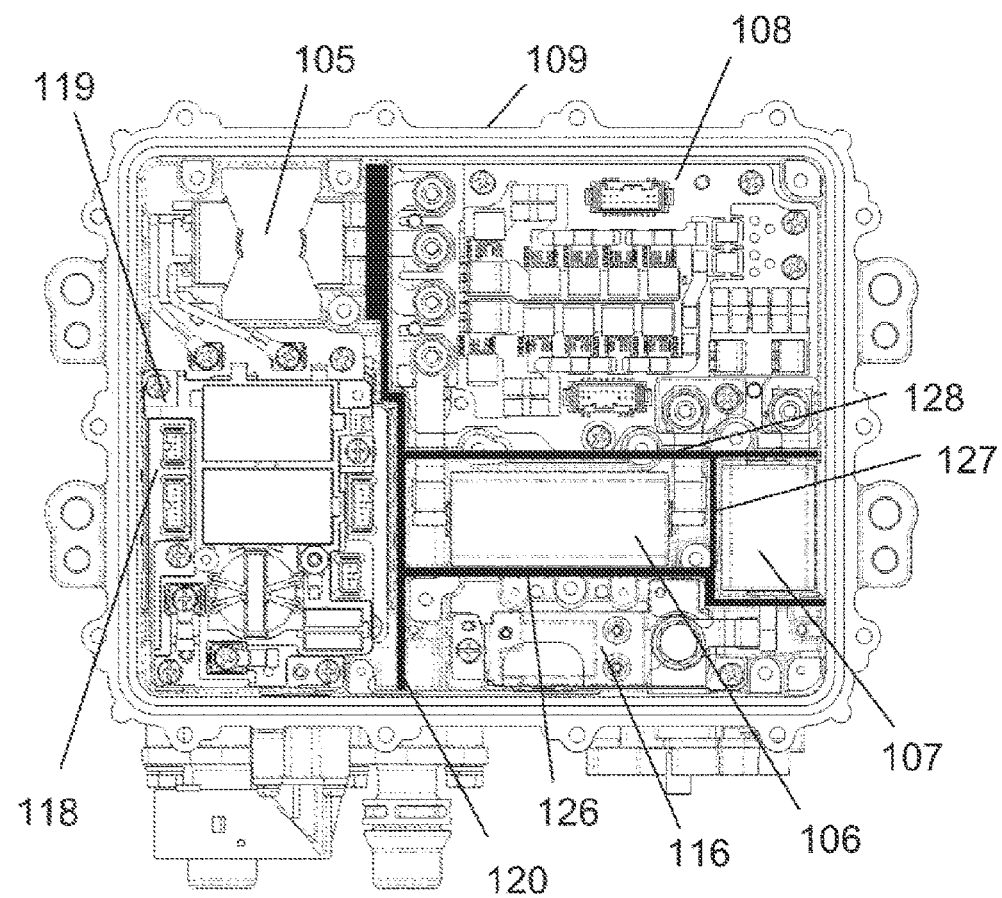

[Fig. 14A]
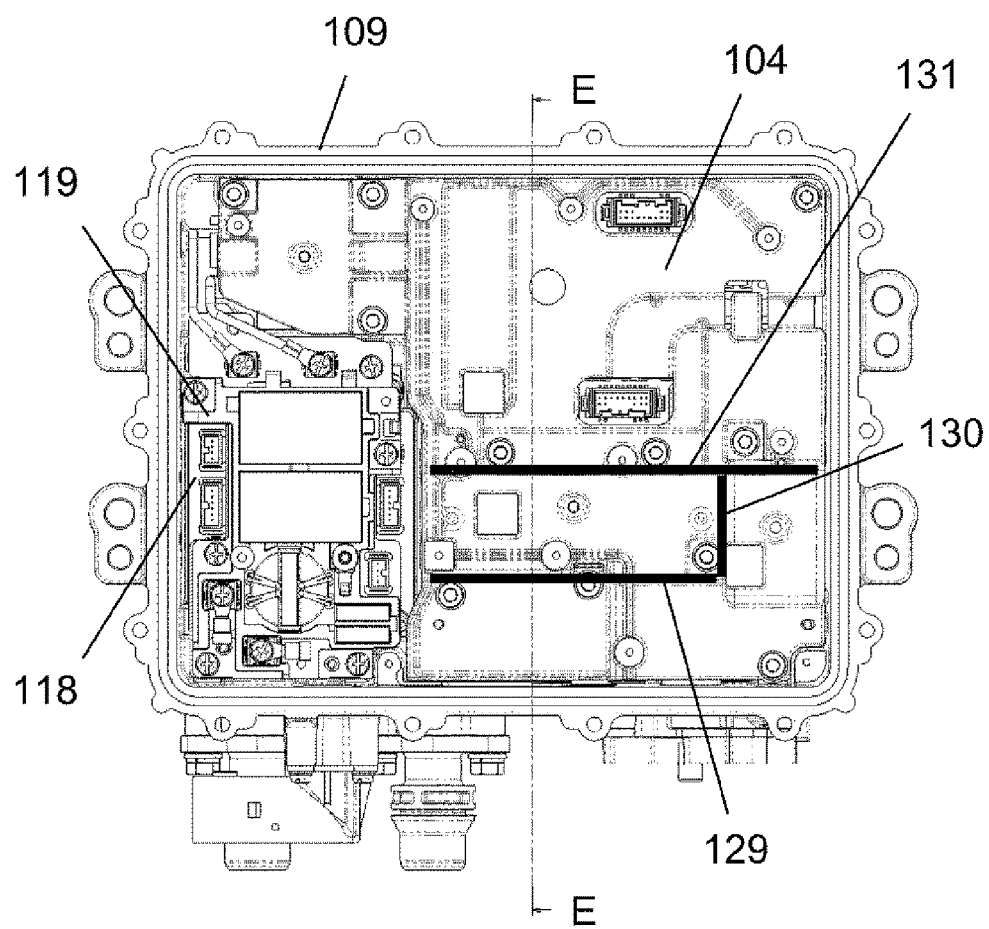

[Fig. 14B]
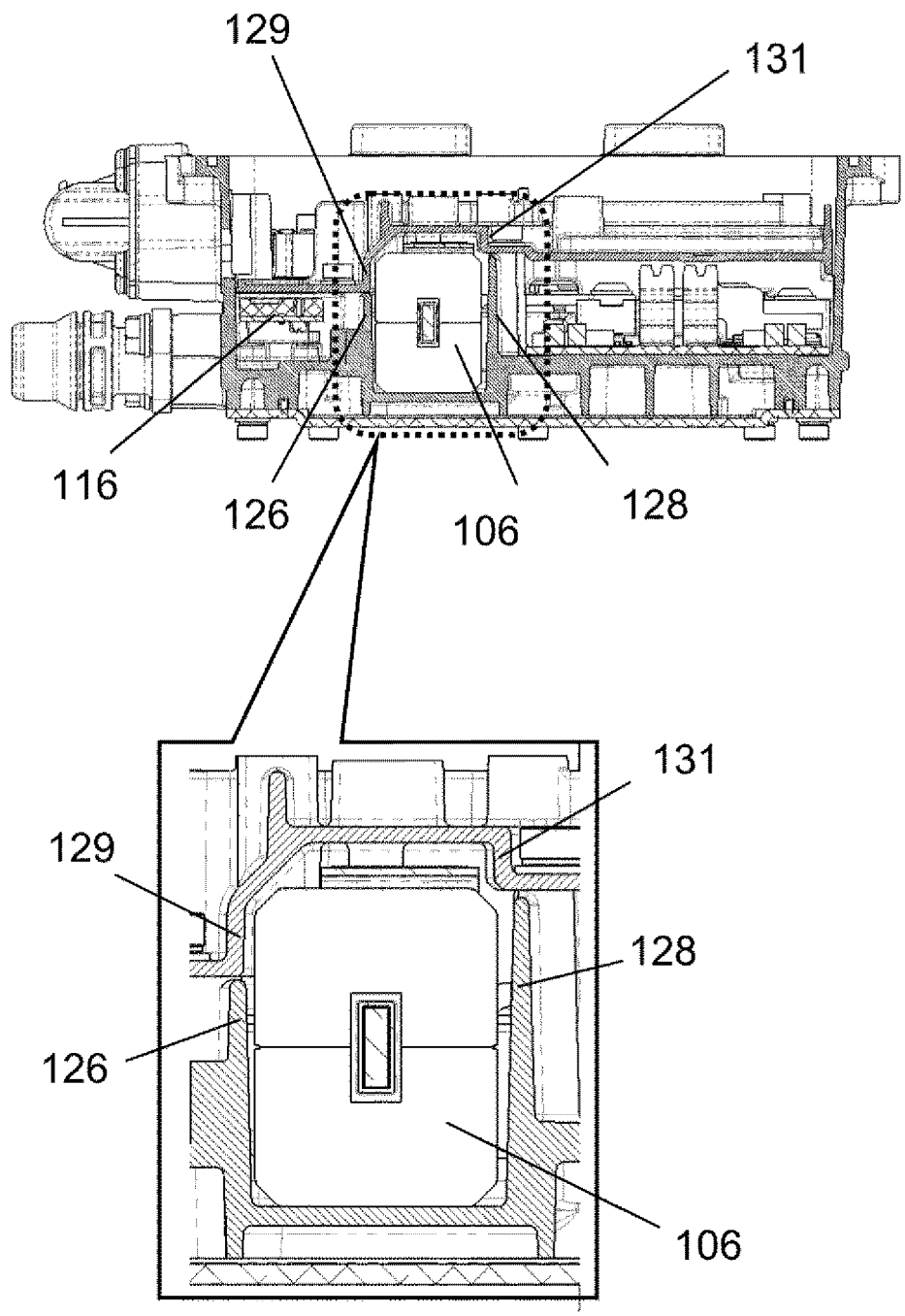

DC-DC CONVERTER

TECHNICAL FIELD

The present invention relates to a DC-DC converter that is mounted on a vehicle (any of a vehicle having only a motor as a driving power source and a vehicle that uses a motor as an auxiliary driving power source are included) which obtains a driving power from an electric motor, and a noise reduction is realized by an internal structure of the DC-DC converter.

BACKGROUND ART

A vehicle (so called an electric vehicle or a hybrid vehicle) that obtains a driving power from an electric motor includes a high voltage battery for driving the electric motor used as a power and a low voltage battery for operating auxiliary devices such as vehicle lightings or a radio. A DC-DC converter device that performs a power conversion from the high voltage battery to the low voltage battery or from the low voltage battery to the high voltage battery is mounted on the above-described vehicle. Hereinafter, the description will be made under the assumption of the power conversion from the high voltage battery to the low voltage battery. However, the direction of the power conversion is not limited thereto.

Generally, a DC-DC converter device has a circuit configuration to include a high voltage side switching circuit that converts a DC high voltage to an AC high voltage, a transformer that converts the AC high voltage to an AC low voltage, a low voltage rectifier circuit that converts the AC low voltage to a DC low voltage, and a control circuit that integrally controls these circuits. In many cases, these circuits are accommodated in a single housing so as to be easily mounted on the vehicle (for example, refer to PTL 1).

However, in this configuration, since the circuit that performs the conversion from DC to AC necessarily exists at the step of the conversion and the handling power is required to be reduced in a high percentage, there occurs a problem in that a noise which is generated from the DC-DC converter influences the other devices (so-called an emission noise). In addition, there is also a problem in that the DC-DC converter erroneously operates due to the influence of a noise (so called an immunity noise) received from the vehicle side or an external environment.

CITATION LIST

Patent Literature

PTL 1: JP-A-2012-178937

SUMMARY OF INVENTION

Technical Problem

An object of the present invention is to provide a noise shielding structure of a DC-DC converter that reduces the noise resulting from the mutual influences between circuit-configuring components.

Solution to Problem

A noise shielding structure of a DC-DC converter in the present invention includes: a high voltage circuit section that is electrically connected to a transformer; a low voltage circuit section that is electrically connected to the transformer; a housing in which the high voltage circuit section and the low voltage circuit section are accommodated; a control circuit board that controls the driving of the low voltage circuit section; and a frame that supports the control circuit board. The frame is arranged on a position facing a bottom surface of the housing while crossing the low voltage circuit section. The housing includes a first wall that separates a first space in which the high voltage circuit section is accommodated and a second space in which circuit components configuring the low voltage circuit section are accommodated. The frame forms a second wall that protrudes toward a direction approaching a leading end of the first wall.

Advantageous Effects of Invention

According to the present invention, by a noise shielding effect obtained by an enclosed space formed of a conductor having a GND potential, a noise resulted from mutual influences between each circuit, each circuit block, or each circuit-configuring component is decreased, and an additional structural component as an objective measure for decreasing the noise is not needed, or it is possible to configure a unit that satisfies a noise regulation value with a minimum number of components.

In addition, since noise interference between each circuit, each circuit block, or each circuit-configuring component can be suppressed, it is possible to reduce the arrangement distance of each circuit, each circuit block, or each circuit-configuring component. Therefore, there is an advantageous effect of reducing the size and weight of the unit.

In addition, as an effect of the integral forming, it is possible to reduce the number of components, and thus, it can be expected that the assembly process becomes simple.

BRIEF DESCRIPTION OF DRAWINGS

FIG. 1 is an example of a configuration diagram of a DC-DC converter circuit.

FIG. 2 is an example of a configuration diagram of a power conversion unit of the DC-DC converter circuit.

FIG. 3 is a configuration example of a DC-DC converter.

FIG. 4A is an example of a perspective view of a housing.

FIG. 4B is a perspective cross-sectional view of the housing.

FIG. 5 is an example of a top plan view of circuits accommodated in the housing.

FIG. 6A is an example of a perspective view of a frame.

FIG. 6B is an example of a perspective cross-sectional view of the frame.

FIG. 7 is an example of a top plan view of a state in which the frame is mounted.

FIG. 8 is an example of a side cross-sectional view of the state in which the frame is mounted.

FIG. 9 is an example of a top plan view of the state in which the frame is mounted.

FIG. 10A is an example of a component arrangement diagram (perspective view) in a frame side of a control board.

FIG. 10B is an example of a component arrangement diagram in a top surface cover side of the control board.

FIG. 11 is an example of a top plan view of a state in which the top surface cover is mounted.

FIG. 12 is an example of a side cross-sectional view of the state in which the control board is mounted.

FIG. 13 is an example of a top plan view of the circuits accommodated in the housing.

FIG. 14A is an example of a top plan view of the state in which the frame is mounted.

FIG. 14B is an example of a side cross-sectional view of the state in which the frame is mounted.

DESCRIPTION OF EMBODIMENTS

A DC-DC converter that is mounted on a vehicle (any of a vehicle having only a motor as a driving power source and a vehicle that uses a motor as an auxiliary driving power source are included) which obtains a driving power from an electric motor generally includes a high voltage side switching circuit, a transformer, a low voltage rectifier circuit, and a control circuit as a minimum basic configuration, and each of them realizes functions described below.

Those are a function of receiving a supply of DC high voltage source power of several hundred volts for driving the electric motor, and a function of converting the DC high voltage to an AC high voltage by receiving a switching signal supplied from the control circuit and performing a switching operation on the high voltage side switching circuit, a function of performing a voltage conversion to convert the AC high voltage to an AC low voltage by the transformer, and then, a function of supplying a DC low voltage power source of several tens of volts which is supplied to auxiliary devices in the vehicle as a function of rectifying AC to convert to DC.

The control circuit is a circuit for calculating and controlling the switching operations when converting the DC to AC, and a circuit for calculating and controlling an optimum switching period according to the power state of both the power sources above and by an instruction via communication from the outside.

The power conversion is not limited to one direction, but includes the performing of a bi-directional conversion (that is, the conversion from the DC high voltage power source to the DC low voltage power source, and conversely, a conversion from the DC low voltage power source to the DC high voltage power source).

In the device that performs the power conversion and is mounted on the vehicle, it is necessary to electrically insulate a high voltage circuit and a low voltage circuit for safety reasons. In a case where the housing is formed of electrically conductive metal, in many cases, the electric potential of the housing is the same as that of the vehicle body, and is used as the reference electric potential (so-called a housing ground=a GND potential) at the low voltage circuits. That is because, in a case of using the housing voltage in the high voltage circuits, there is a risk of leakage or an electric shock.

However, from a condition of a vehicle mounting, being a compact and integrated unit is strongly required, and thus, in almost every case, the high voltage circuit and the low voltage circuit are accommodated in the housing which has the same electric potential as the vehicle body, and configure the integrated unit, and then, achieve the power conversion function. As general power conversion characteristics of the DC-DC converter, the voltage is high but the current is comparatively low (approximately less than 30 A) in the high voltage circuit, and the voltage is low but the current is comparatively high (approximately less than 200 A) in the low voltage circuit.

In a case of accommodating the high voltage circuit and the low voltage circuit in the same housing, due to the above-described power conversion characteristics, a mutual relationship of a position and an arrangement distance, and a situation of the housing and a frame of each circuit in the arrangement in the housing, there occurs a phenomenon in which a voltage-dependent noise of the high voltage circuit is emitted and mixed into the other circuit and a phenomenon in which a current-dependent noise of the low voltage circuit is emitted and mixed into the other circuit. In addition, a difference in a degree of noise influence received from the vehicle side or an outside environment also occurs.

As a result, a problem occurs, in that the power conversion function as a basic function of the DC-DC converter operates erroneously, or noise regulation values (a legal requirement of each nation and a customer-required specification) are not satisfied.

In order to solve these problems, of course, the circuit is required to be revised. However, it is necessary to add a shield case or conduction-enhancement components as new structural components for counter measures for the noise, which results in increase in cost and the increase in the volume and the weight of the products.

The present invention includes a plurality of means for solving the above-mentioned problems. However, hereinafter, as an example of the means, embodiments of a power conversion device in the present invention will be described with reference to the drawings. In the drawings, the same signs will be given to the same elements and the description thereof will not be repeated.

First Embodiment

FIG. 1 is an example of a configuration diagram of a DC-DC converter circuit in a first embodiment. Hereinafter, the description will be made under the assumption of the power conversion from the high voltage battery to the low voltage battery. However, the direction of the power conversion is not limited thereto.

As illustrated in FIG. 1, a DC high voltage power source of several hundred volts supplied from the vehicle side is connected to a high voltage circuit section. The high voltage circuit section transfers a power of which the voltage is converted, to a low voltage circuit section via a transformer. The low voltage circuit section is connected to a DC low voltage power source circuit in the vehicle. In addition, the control circuit unit is connected to the high voltage circuit section and the low voltage circuit section.

The high voltage circuit section is configured to include a DC high voltage power source filter circuit and a high voltage switching circuit. A DC high voltage power input to the high voltage circuit section is converted to AC by the high voltage switching circuit remaining as the high voltage. The high voltage power converted to AC is supplied to a primary side of the transformer and then, transferred to a secondary side of the transformer.

The low voltage circuit section is configured to include a low voltage rectifier circuit and a DC low voltage power source filter circuit. The power transferred to the secondary side of the transformer is caused to pass the low voltage rectifier circuit to return to the DC. Furthermore, in order to eliminate a switching noise generated during the conversion to AC, the DC power is caused to pass the low voltage power source filter circuit, and finally, supplied to the vehicle side as a DC low voltage power source of several tens of volts.

The control circuit unit generates switching signals which are supplied to the high voltage switching circuit and the low voltage rectifier circuit, and performs the overall operation control of the DC-DC converter. The control circuit unit is roughly divided into a high voltage control circuit unit and a low voltage control circuit unit. The high voltage control circuit unit and the low voltage control circuit unit are configured to be electrically insulated.

The high voltage control circuit unit is configured to include a switching element driving circuit that supplies the switching signal to the high voltage switching circuit and sensor circuits that acquire information necessary for stably controlling the voltage, current, and temperature of the high voltage circuit section.

The low voltage control circuit unit is configured to include a switching element driving circuit that supplies the switching signal to the low voltage rectifier circuit, sensor circuits that acquire information necessary for stably controlling the voltage, current, and temperature of the low voltage circuit section, a control section power source circuit, a communication circuit that performs communication with a vehicle side control unit, a vehicle signal processing circuit that processes the signal supplied from the vehicle side, and a calculation processing and control processing circuit (DSP and CPU) that performs the calculation and integral operation control of the switching signals based on the information collected by the above-described configuration elements. The configuration of the control circuit unit is not limited to that described above.

FIG. 2 is an example of a configuration diagram of a power conversion unit of the DC-DC converter circuit. The power conversion unit of the DC-DC converter circuit illustrated in FIG. 2 is configured to include the high voltage circuit section and the low voltage circuit section in FIG. 1.

The DC high voltage power source filter circuit is basically configured to include a coil and capacitors. As illustrated in FIG. 2, the capacitors include any one of a Cx (so-called an X capacitor) that is connected between both terminals of the high voltage power source, and Cy's (so-called Y capacitors) that are connected between the terminals of the high voltage power source and the reference potential (GND potential). As illustrated in FIG. 2, the DC high voltage power source filter circuit may be configured to include only the capacitors. Here, the Cx and the Cy do not indicate the number of elements, but are examples of the circuit symbols. Of course, the circuit may be realized by using a plurality of elements. This is also applied to H1, S1, and the like described below.

The high voltage switching circuit is formed of four MOS-FETs that are connected in the bridge type (so-called a full bridge type formed of H1, H2, H3, and H4). In addition, a snubber capacitor is connected to the MOS-FET in parallel. The four MOS-FETs (H1, H2, H3, and H4) in the high voltage side switching circuit are optimally controlled by a phase shift PWM control by acquiring necessary elements such as an amount of output load and the input voltage from the control circuit unit. By performing the phase shift PWM control, it is possible to generate a high voltage converted to AC at the primary side of the transformer. The connection of the MOS-FETs is an example, and may be realized by another connection method without being limited to the above-described method.

The transformer has an insulated structure between the primary side and the secondary side. A turn ratio of the primary side and the secondary side of the transformer is set to an optimal turn ratio according to the relation between the input power source and the output power source. In the input stage of the transformer, a resonance chalk coil Lr is provided for performing a soft switching operation. A zero-voltage switching of the MOS-FET configuring the high voltage side switching circuit can be performed using a combined inductance of the resonance chalk coil inductance and a leakage inductance of the transformer. However, the resonance chalk coil is not necessarily needed, and the circuit configuration of the transformer may not include the resonance chalk coil.

The low voltage rectifier circuit is formed of four MOS-FETs (S1, S2, S3, and S4), a coil L0, and capacitors C0 and Cc. The low voltage rectifier circuit performs a rectification by a synchronous rectification method, and realizes a surge absorption by an active clamp method. The switching timings of the S1, S2, S3, and S4 are cooperatively controlled with a phase shift PWM control pulse that acquires the necessary elements such as an amount of output load and the input voltage by the control circuit unit and supplies the elements to the high voltage switching circuit. The configuration of the low voltage rectifier circuit section is not necessarily the same as the above-described synchronous rectification method, and may be a configuration using a diode rectification method or an active clamp method.

The DC low voltage power source filter circuit is configured to include a coil L1 and a capacitor C1. However, the DC low voltage power source filter circuit is not necessarily needed and an adoption of the circuit may be determined according to the product specification.

Next, the overall structure of a DC-DC converter device 100 will be described. FIG. 3 to FIG. 12 are examples of the configuration diagram of the DC-DC converter device 100 in the present embodiment.

FIG. 3 is a configuration diagram of the DC-DC converter device 100 in the embodiment of the present invention. In the DC-DC converter device 100, components configuring the above-described DC-DC converter circuit are accommodated in a box-shaped housing which is formed of electrically conductive metal such as aluminum die-cast.

A top surface cover 101 formed of an electrically conductive metal is mounted on an upper portion of a housing 109 formed of the same electrically conductive metal by a screw, and the housing 109 and the top surface cover 101 form a metal box in which the electric connection is achieved at the same electric potential. In the space formed of the housing 109 and the top surface cover 101, the components configuring the DC-DC converter circuit are accommodated, fixed, held, and wired.

Between the housing 109 and the top surface cover 101, an airtight O-ring 102 is provided such that water or the like does not penetrate into the housing. At the bottom portion of the housing 109, a cooling flow path is formed for cooling the components accommodated in the housing. The cooling flow path is sealed by mounting a bottom surface cover 111 by screws while interposing a watertight O-ring 110.

A pipe 114 is mounted on any one surface of the side surfaces of the housing 109. Cooling medium is supplied to the cooling flow path from one end of the pipe 114 and collected at the other end. A water cooling method is adopted in the present embodiment, but another cooling method may be adopted.

An input connector 115 is provided on any one surface of the side surfaces of the housing 109. The input connector 115 connects a wiring through which the DC high voltage power from the high voltage battery is supplied to the DC-DC converter circuit accommodated in the housing. In addition, an output connector 112 for connecting the wiring is provided, through which the DC low voltage is output from the DC-DC converter circuit in the housing. Furthermore, a signal connector 113 for exchanging a vehicle system signal with the DC-DC converter circuit in the housing is provided as a wire. In the drawing, the above-described input connector 115, the output connector 112, and the signal connector 113 are mounted on the any one side surface of the side surfaces of the housing in a concentrated manner. However, the connectors may be mounted on the side surfaces different from each other.

Regarding the high voltage circuit section, the high voltage switching circuit and the DC high voltage power source filter circuit are mounted on circuit boards different from each other. The high voltage switching circuit is mounted on a high voltage switching circuit board 118. The high voltage switching circuit board 118 is mounted on the bottom surface side of the housing 109 in order to effectively cool the four MOS-FETs of which the heat generation is large. The DC high voltage power source filter circuit is mounted on a high voltage power supply filter board 119. The high voltage power supply filter board 119 is arranged on the upper layer of the high voltage switching circuit board 118 in the housing 109 in a stacked manner. In addition, a resonance coil 117 that corresponds to the resonance chalk coil Lr is arranged on the bottom surface side of the housing 109 because the resonance coil 117 is also a component of which the heat generation is large similar to the case of MOS-FETs.

Regarding the low voltage circuit section, a rectifying coil 106 that corresponds to the rectifying coil L0 of the low voltage rectifier circuit and a filter coil 107 that corresponds to the filter coil L1 are not mounted on the board but accommodated in the housing. The rectifying coil 106 and the filter coil 107 are connected to each other by a bus bar wiring. The capacitor C1 is mounted on an independent capacitor board 116. The capacitor board 116 is arranged nearest to a DC low voltage output connector 112 such that the noise can effectively be absorbed. Specifically, arrangement nearest to the output connector indicates that a connection terminal of the capacitor board 116 and a connection terminal of the DC low voltage output connector 112 are configured to be connected only to the wiring bus bar output from the filter coil 107, and directly connected to each other without going through other components. The other components (S1, S2, S3, S4, C0, and Cc) are mounted on a low voltage rectifier circuit board 108. The low voltage rectifier circuit board 108 is accommodated on the bottom surface side of the housing in order to effectively cool the S1, S2, S3, and S4 of which the heat generation is large. Another method of configuring the board or another method of arranging each of the components in the low voltage circuit section may be adopted.

A transformer 105 is arranged between the high voltage circuit section and the low voltage circuit section, and a primary winding is connected to the high voltage circuit and a secondary winding is connected to the low voltage circuit. In addition, the transformer 105 is also a component of which the heat generation is large, and thus, is arranged on the bottom surface side of the housing 109.

In the control circuit unit, the high voltage control circuit unit and the low voltage control circuit unit are mounted on one control board 103. In the control board 103, as an object to avoid the mutual noise interference and to achieve the electrical insulation, the high voltage control circuit unit and the low voltage control circuit unit are arranged and mounted in a clearly separated manner. For the same object, the high voltage control circuit unit and the low voltage control circuit unit that configure the control circuit unit may be configured on separate boards.

Besides the components corresponding to the high voltage circuit section, the low voltage circuit section, and the control circuit unit, a frame 104 is accommodated in the housing 109.

FIG. 4(a) is a perspective view of the housing 109 formed of electrically conductive metal. FIG. 4(b) is a perspective cross-sectional view of the housing 109 taken along a cross section A in FIG. 4(a). As illustrated in FIG. 4, in the inner side of the housing 109, a first wall 120 protruding toward the direction from the bottom surface side of the housing to the upper surface of the housing is formed. The space in the housing 109 is divided into a first space 150 and a second space 151 by the first wall 120.

In the first space 150, the configuration elements of the high voltage circuit section are accommodated. Among the configuration elements, the components of which the heat generation is large, that is, the resonance coil 117, the high voltage switching circuit board 118, and the transformer 105 are accommodated on the bottom layer. The high voltage power supply filter board 119 is accommodated on the upper layer thereof.

In the second space 151, the configuration elements of the low voltage circuit section, that is, the low voltage rectifier circuit board 108, the rectifying coil 106, the filter coil 107, and the capacitor board 116 are accommodated.

In addition, as illustrated in FIG. 4(a), a plurality of screw fixing supports 123 is installed in the housing 109. The screw fixing support 123 is installed to stand toward the direction from the housing side to the upper surface of the housing. The screw fixing support 123 is to mutually hold and fix the housing 109 and the frame 104 and to achieve a stable electrical connection between each other. The holding and fixing of the frame 104 will be described in FIG. 8. Although not illustrated, the screw fixing support 123 may be integrally formed on a part of the first wall 120.

FIG. 5 is an example of a top plan view of the component arrangement diagram when the configuration elements of the high voltage circuit section and the configuration elements of the low voltage circuit section are accommodated in the housing 109. In FIG. 5, with the first wall 120 as a boundary, the left side on the sheet is the first space 150 and the right side on the sheet is the second space 151. As described above, the resonance coil 117, the high voltage switching circuit board 118, the transformer 105, and the high voltage power supply filter board 119 are accommodated in the first space 150. The transformer 105 is arranged close to the first wall 120.

The transformer 105 includes a secondary side wiring lead portion 105-A that is connected to the low voltage rectifier circuit board 108. Since the secondary side wiring lead portion 105-A of the transformer 105 is electrically in the low voltage potential of the secondary side, it is preferable that the secondary side wiring lead portion 105-A is arranged in the second space as much as possible. Therefore, the secondary side wiring lead portion 105-A of the transformer 105 is arranged so as not to protrude to the left side of the first wall 120, that is, the first space 150 as much as possible. This is because the secondary side wiring lead portion 105-A is a component that configures a part of the transformer 105, and it is not possible to be entirely separated in terms of the space, and thus, there is no other way but to partially exist on the first space 150.

FIG. 6(a) is a perspective view of a frame 104. The frame 104 formed of electrically conductive metal is arranged on the upper portion of the circuit components configuring the above-described low voltage circuit section as illustrated in FIG. 3. Screw fixing supports 124 are formed on the frame 104. The screw fixing supports 124 are provided for fixing the screws after mounting the control board 103 on which the control circuit unit is mounted. The screw fixing supports 124 are formed on the upper surface side of the frame 104, that is, on the side on which the control board 103 is arranged.

FIG. 6(b) is a perspective cross-sectional view of the frame 104 taken along a cross section B in FIG. 6(a). As illustrated in FIG. 6(b), the frame 104 forms a second wall 121 on the bottom surface that is opposite to the top surface on which the screw fixing supports 124 are formed. The second wall 121 protrudes toward a direction of the bottom surface cover 111 of the housing 109. In addition, a third wall 122 is formed on the top surface on which the screw fixing supports 124 are formed. The third wall 122 protrudes toward the direction of the top surface cover 101 of the housing 109.

In FIG. 7, a top plan view of the component arrangement diagram in a state in which the frame 104 is mounted in the state of FIG. 5 is illustrated. As illustrated in FIG. 7, in a case of seeing the frame 104 from the top surface, the second wall 121 is formed so as to overlap the wall surface position of the first wall 120.

FIG. 8 is a cross-sectional view taken along a C-C cross section of FIG. 7. As illustrated in FIG. 8, the second wall 121 formed on the frame 104 protrudes toward a direction approaching the leading end of the first wall 120 formed on the housing 109. In addition, the third wall 122 protrudes toward a direction opposite to the direction toward which the second wall 121 protrudes.

The frame 104 is screwed to be fixed to the screw fixing support 123 (refer to FIG. 4) formed on the housing 109. In this way, the housing 109 and the frame 104 are electrically connected to each other and have the same electric potential. In the present embodiment, the screw fixing support 123 is formed toward the direction from the bottom surface side of the housing to the top surface. However, the screw fixing support 123 may be formed toward the direction from the bottom surface side of the frame 104 to the bottom surface side of the housing.

The second space 151 in which the low voltage circuit section is accommodated is formed of the housing 109, the frame 104, the first wall 120, and the second wall 121. Therefore, since the second space 151 becomes a space enclosed by metallic conductors having the electrically same potential which is GND potential, it is possible to obtain a noise shielding effect. By this noise shielding effect, it is possible to suppress the high voltage switching noise generated from the high voltage circuit section or the external noise mixed into the high voltage power source supplied from the vehicle side, from being mixed into the low voltage circuit section. In addition, it is possible to suppress the noise generated in the low voltage circuit section from being mixed into the high voltage circuit section or the control circuit.

In FIG. 9, a top plan view of the component arrangement diagram in the state in which the frame 104 is mounted is illustrated. In FIG. 7, in order to explain the arrangement of the second wall 121, the second wall 121 is emphasized in the illustration. However, in FIG. 9, in order to explain the arrangement of the third wall, the third wall 122 is emphasized in the illustration. As illustrated in FIG. 8, the third wall 122 is formed on the top surface of the frame 104 in a direction toward a top surface cover portion of the housing 109.

As illustrated in the cross-sectional view in FIG. 8 and the top plan view in FIG. 9, the wall surface installation position of the third wall 122 is formed close to the second wall 121. In addition, a plurality of screw fixing supports 124 for achieving the holding and fixing the control board 103 and the stable electric connection are also formed in the same direction.

In the present embodiment, the wall surface forming position of the third wall 122 is a position close to the second wall 121 seen from the top surface of the frame 104, but the position may not necessarily be the close arrangement.

In addition, in the present embodiment, the third wall 122 is integrally formed with the screw fixing support 124, but the third wall 122 may not be integrally formed with the screw fixing support 124. In addition, a greater number of screw fixing supports 124 may be integrally formed than in the present embodiment.

FIGS. 10(a) and 10(b) are diagrams illustrating the component arrangement on the control board 103. FIG. 10(a) is a perspective component arrangement diagram in the frame 104 side of a control board 103. FIG. 10(b) is a component arrangement diagram in a top surface side of the control board 103. The control circuit unit is mounted on the control board 103. The control circuit unit, as illustrated in FIG. 1, is divided into the high voltage control circuit unit and the low voltage control circuit unit.

As illustrated in FIG. 10(a), a control board pattern of the control circuit board 103 in the frame 104 side is mounted while being divided into a first area 160 on which the high voltage control circuit unit is mounted and a second area 161 on which the low voltage control circuit unit is mounted. An arrangement boundary is provided between the first area 160 and the second area 161. The arrangement boundary is provided along the third wall 122 as illustrated in FIG. 10(a).

The control board pattern of the arrangement boundary portion along the third wall 122 in the frame side provides a pattern of the reference electric potential in the low voltage control circuit unit in the control board 103. The reference electric potential here is a reference electric potential of the low voltage circuit section under the assumption that the housing 109 and the frame 104 are connected to each other, so-called a housing ground potential (GND potential). In addition, the control board 103 is configured to be a multi-layer board, and one layer among the inner layers is configured to be a pattern of the reference electric potential in the low voltage control circuit unit, that is, a GND pattern. The GND pattern is laid only in the second area 161 that includes the arrangement boundary, and is as solid a surface as possible.

The GND pattern is screwed and fixed to the screw fixing support 124 that is integrally formed with the third wall 122 provided on the frame 104, and electrically connected to the screw fixing support 124. That is, the reference electric potential in the housing 109, the frame 104, and the low voltage control circuit unit in the control board 103 is the same electric potential.

As illustrated in FIG. 10(b), the control board pattern of the control circuit board 103 in the top surface side is mounted while being divided into a third area 162 on which the high voltage control circuit unit is mounted and a fourth area 163 on which the low voltage control circuit unit is mounted. An arrangement boundary is provided between the third area 162 and the fourth area 163 similar to the case in FIG. 10(a). The arrangement boundary is provided along a fourth wall 125 (refer to FIGS. 11 and 12).

FIG. 11 is a top plan view in a state in which the top surface cover 101 formed of electrically conductive metal is mounted. The top surface cover 101 is arranged on the upper portion of the control board 103. In addition, the top surface cover 101 is screwed to be fixed to the housing 109 and electrically connected to the housing 109. Therefore, the housing 109 and the top surface cover 101 have the same electric potential.

On the top surface cover 101, the fourth wall 125 is formed on the side facing the control board 103. As illustrated in FIG. 11, seen from the top surface, the fourth wall 125 is formed on the position overlapping the third wall 122. The arrangement boundary between the third area 162 and the fourth area 163 is provided so as to be along the fourth wall (refer to FIG. 10(b)).

FIG. 12 is a side cross-sectional view taken along the cross section C-C in FIG. 11. As described above, by the first wall 120 formed on the housing 109, the first space 150 and the second space 151 are separated. The second space 151 is formed of the housing 109, the frame 104, the first wall 120, and the second wall 121.

On the upper layer of the second space 151, a third space 152 that is enclosed by the housing 109, the frame 104, the third wall 122, and the control board 103 is formed. The third space 152 is separated from the first space 150 by the third wall 122.

As described above, in the inner layer of the control board 103, the GND pattern is provided. By this configuration, the third space 152 that is enclosed by the metallic conductor having electrically the same potential which is the GND potential by the housing 109, the frame 104, the third wall 122, and the GND pattern in the inner layer of the control board, is formed on the upper layer of the second space 151. In the third space 152, only the low voltage control circuit unit existing in the second area 161 of the control board 103 is arranged. On the other hand, on the upper layer of the first space 150 in which the high voltage circuit section is accommodated, the high voltage control circuit unit existing in the first area 160 of the control board 103 is arranged.

Accordingly, the mounted components and the pattern in the frame side existing in the second area 161 of the control board 103 are enclosed in the third space 152 in the state of being enclosed by the metallic conductor having the electrically same potential which is the GND potential, and thus, it is possible to obtain the noise shielding effect. Since the noise shielding effect of the third space 152 is effective to the first space 150, it is possible to suppress the high voltage switching noise generated from the high voltage control circuit unit and the high voltage circuit section or the external noise mixed into the high voltage power source supplied from the vehicle side, from being mixed into the low voltage circuit section. In addition, it is also possible to suppress the noise generated in the low voltage circuit section from being mixed into the high voltage control circuit unit or the high voltage circuit section.

Concurrently, since the noise shielding effect of the third space 152 is also effective to the second space 151, it is possible to suppress the switching noise generated in the low voltage circuit section from being mixed into the low voltage control circuit unit. In addition, it is also possible to suppress the noise generated from the low voltage control circuit unit from mixing into the low voltage circuit section.

In addition, in the present embodiment, the fourth wall 125 is also provided on the top surface cover 101. By this configuration, a fourth space 153 enclosed by the metallic conductor having electrically the same potential which is the GND potential by the housing 109, the top surface cover 101, the fourth wall 125, and the GND pattern in the inner layer of the control board, is formed on the upper layer of the third space 152. In this fourth space 153, only the low voltage control circuit unit existing in the fourth area 163 of the control board 103 is arranged. On the other hand, on the upper layer of the first space 150 in which the high voltage circuit section is accommodated, the high voltage control circuit unit existing in the third area 162 of the control board 103 is arranged.

Accordingly, the mounted components and the pattern on the top surface cover 101 side existing on the fourth area 163 of the control board 103 are enclosed in the fourth space 153 in the state of being enclosed by the metallic conductor having the electrically same potential which is the GND potential, and thus, it is possible to obtain the noise shielding effect. The noise shielding effect of the fourth space 153 is combined with the noise shielding effect of the third space 152, and thus, it is possible to obtain an improved noise shielding effect with respect to the first space 150. It is possible to suppress the high voltage switching noise generated from the high voltage control circuit unit and the high voltage circuit section or the external noise mixed into the high voltage power source supplied from the vehicle side, from being mixed into the low voltage circuit section. In addition, it is also possible to suppress the noise generated in the low voltage circuit section from being mixed into the high voltage control circuit unit or the high voltage circuit section.

In the description above, the noise shielding structure of the DC-DC converter in the present embodiment is described. However, the enclosed space configured with the housing, the frame, and the GND pattern on the board may have a gap, a hole, or a partial protrusion to the extent that the noise shielding effect is not impaired in accordance with the assembled state.

In addition, in a wall-shaped portion of the housing and the frame which is an enclosed space configuring surface may be used for another purpose as the structural component: for example, for providing a screw hole or a screw fixing support in order to electrically and mechanically fix the housing and the frame; for providing a screw hole or a screw fixing support in order to electrically and mechanically fix another structural component or a board; or for dissipating the heat of the electric components.

Second Embodiment

Next, as an application example of the first embodiment, a second embodiment in which a space is formed for each circuit component will be described.

FIG. 13 is an example of arranging the circuits in the housing of the DC-DC converter in the second embodiment. In the present embodiment, as an example, the rectifying coil 106, the filter coil 107, and the capacitor board 116 among the circuit components in the low voltage circuit section are shielded.

Due to a restriction in the arrangement, in a case where each of the above-described components is inevitably arranged in close proximity as in the top plan view of the component arrangement diagram in FIG. 13, the noise is propagated to the filter coil 107 or the capacitor board 116 from the rectifying coil 106 through the space. In this case, similar to the case in the first embodiment, it is possible to obtain the similar noise shielding effect by providing a wall on the housing 109 and the frame 104. As in FIG. 13, around the rectifying coil 106, a fifth wall 126, a sixth wall 127, and a seventh wall 128 are formed toward the direction from the bottom surface to the top surface of the housing 109.

FIG. 14(a) is a top plan view of the state in which frame 104 is mounted to the state illustrated in FIG. 13. On the frame 104 in the present embodiment, walls protruding toward the bottom surface direction are formed on the position corresponding to the fifth wall 126, the sixth wall 127, and the seventh wall 128. An eighth wall 129 is formed on the position corresponding to the fifth wall 126. A ninth wall 130 is formed on the position corresponding to the sixth wall 127. A tenth wall 131 is formed on the position corresponding to the seventh wall 128.

FIG. 14(*b*) is a side cross-sectional view taken along the cross section E-E in FIG. 14(*a*). As illustrated in FIG. 14(*b*), a leading end portion of the fifth wall 126 is formed so as to face the eighth wall 129. In addition, a leading end portion of the seventh wall 128 is formed so as to face the tenth wall 131. In addition, a leading end portion of the sixth wall 128 and the ninth wall 130 are also formed to face each other, but not illustrated in the cross-sectional view of FIG. 14(*b*). Then, the rectifying coil 106 is arranged so as to be enclosed in these fifth wall 126 to the tenth wall 131.

By configuring in this way, the space enclosed by the metallic conductor having electrically the same potential which is the GND potential can be formed around the rectifying coil 106. Therefore, it is possible to obtain the noise shielding effect. That is, the noise that is propagated to the filter coil 107 and the capacitor board 116 from the rectifying coil 106 through the space can be suppressed.

In the present embodiment, the noise shielding is implemented between the circuit components which are easily influenced by the noise between each other. However, by applying the noise shielding to other components, a restriction in arrangement distance between the configuration components can be alleviated and the degree of freedom in component arrangement can be increased. Therefore, it is possible to miniaturize the device.

REFERENCE SIGNS LIST

100 DC-DC converter device
101 top surface cover
102 airtight O-ring
103 control board
104 frame
105 transformer
105-A secondary side wiring lead portion
106 rectifying coil
107 filter coil
108 low voltage rectifier circuit board
109 housing
110 watertight O-ring
111 bottom surface cover
112 output connector
113 signal connector
114 pipe
115 input connector
116 capacitor board
117 resonance coil
118 high voltage switching circuit board
119 high voltage power supply filter board
120 first wall
121 second wall
122 third wall
123 housing side screw fixing support
124 frame side screw fixing support
125 fourth wall
126 fifth wall
127 sixth wall
128 seventh wall
129 eighth wall
130 ninth wall
131 tenth wall
150 first space
151 second space
152 third space
153 fourth space
160 first area
161 second area
162 third area
163 fourth area

The invention claimed is:

1. A DC-DC converter comprising:
a high voltage circuit section that is electrically connected to a transformer;
a low voltage circuit section that is electrically connected to the transformer;
a housing in which the high voltage circuit section and the low voltage circuit section are accommodated;
a control circuit board that controls the driving of the low voltage circuit section; and
a frame that supports the control circuit board,
wherein the frame is arranged on a position facing a bottom surface of the housing while crossing the low voltage circuit section,
wherein the frame includes a second wall that protrudes toward a direction approaching a bottom surface of the housing, and
wherein the second wall separates a first space in which the high voltage circuit section is accommodated and a second space in which circuit components configuring the low voltage circuit section are accommodated.

2. The DC-DC converter according to claim 1,
wherein the control circuit board includes a first area on which a circuit section that outputs a control signal controlling the high voltage circuit section is mounted, and a second area on which a circuit section that outputs a control signal controlling the low voltage circuit section is mounted, and
wherein the control circuit board is arranged in such a manner that the first area faces the high voltage circuit section and the second area faces the low voltage circuit section.

3. The DC-DC converter according to claim 1,
wherein the frame forms a third wall that protrudes toward a direction opposite to the direction toward which the second wall protrudes, and
wherein the third wall is arranged on a position that separates a third space between the frame and the control circuit board and the first space.

4. The DC-DC converter according to claim 3,
wherein the high voltage circuit section is configured to include a high voltage side switching circuit portion and a capacitor having a filtering function,
wherein the high voltage side switching circuit portion is arranged on the bottom surface of the housing, and
wherein the capacitor is arranged in a position further away from the bottom surface of the housing than the high voltage side switching circuit portion is.

5. The DC-DC converter according to claim 1,
wherein the housing includes a first wall that separates the first space and the second space.

6. The DC-DC converter according to claim 5,
wherein the control circuit board includes a first area on which a circuit section that outputs a control signal controlling the high voltage circuit section is mounted, and a second area on which a circuit section that outputs a control signal controlling the low voltage circuit section is mounted, and wherein the control circuit board is arranged in such a manner that the first area faces the high voltage circuit section and the second area faces the low voltage circuit section.

7. The DC-DC converter according to claim 5,
wherein the frame forms a third wall that protrudes toward a direction opposite to the direction toward which the second wall protrudes, and
wherein the third wall is arranged on a position that separates a third space between the frame and the control circuit board and the first space.

8. The DC-DC converter according to claim 7,
wherein the high voltage circuit section is configured to include a high voltage side switching circuit portion and a capacitor having a filtering function,
wherein the high voltage side switching circuit portion is arranged on the bottom surface of the housing, and
wherein the capacitor is arranged in a position further away from the bottom surface of the housing than the high voltage side switching circuit portion is.

* * * * *